(12) United States Patent
Knapp (10) Patent No.: US 8,463,510 B2
(45) Date of Patent: Jun. 11, 2013

(54) GPS CONTROLLED RESIDUE SPREAD WIDTH

(75) Inventor: Kevin Frederick Knapp, Leola, PA (US)

(73) Assignee: CNH America LLC, New Holland, PA (US)

( * ) Notice: Subject to any disclaimer, the term of this patent is extended or adjusted under 35 U.S.C. 154(b) by 445 days.

(21) Appl. No.: 12/771,598

(22) Filed: Apr. 30, 2010

(65) Prior Publication Data

US 2011/0270495 A1    Nov. 3, 2011

(51) Int. Cl.
    *A01D 41/12*    (2006.01)
(52) U.S. Cl.
    USPC .......................................... 701/50
(58) Field of Classification Search
    USPC .................... 701/50; 460/111, 112
    See application file for complete search history.

(56) References Cited

U.S. PATENT DOCUMENTS

| | | | |
|---|---|---|---|
| 4,212,143 A | 7/1980 | Chaumont | |
| 5,569,081 A * | 10/1996 | Baumgarten et al. | 460/112 |
| 5,666,793 A * | 9/1997 | Bottinger | 56/10.2 R |
| 5,754,137 A * | 5/1998 | Durrstein | 701/50 |
| 5,837,906 A | 11/1998 | Palmer | |
| 5,955,973 A | 9/1999 | Anderson | |
| 5,957,304 A | 9/1999 | Dawson | |
| 5,978,723 A | 11/1999 | Hale et al. | |
| 6,212,862 B1 * | 4/2001 | Staub | 56/10.2 R |
| 6,345,231 B2 * | 2/2002 | Quincke | 701/468 |
| 6,908,379 B2 | 6/2005 | Gryspeerdt et al. | |
| 6,976,913 B2 | 12/2005 | Duquesne et al. | |
| 7,261,633 B2 | 8/2007 | Benes | |
| 7,281,974 B2 | 10/2007 | Anderson et al. | |
| 7,306,174 B2 | 12/2007 | Pearson et al. | |
| 7,390,253 B2 | 6/2008 | Farley et al. | |
| 7,467,997 B2 | 12/2008 | Niermann et al. | |
| 7,485,035 B1 | 2/2009 | Yde | |
| 7,487,024 B2 | 2/2009 | Farley et al. | |
| 7,993,188 B2 * | 8/2011 | Ritter | 460/111 |
| 8,177,610 B2 * | 5/2012 | Birrell et al. | 460/111 |
| 2006/0200294 A1 | 9/2006 | Scheufler et al. | |
| 2007/0005208 A1 | 1/2007 | Han et al. | |
| 2007/0198185 A1 | 8/2007 | McClure et al. | |
| 2008/0188275 A1 | 8/2008 | Mayerle et al. | |
| 2008/0248843 A1 | 10/2008 | Birrell et al. | |
| 2008/0269956 A1 | 10/2008 | Dix et al. | |
| 2009/0192654 A1 * | 7/2009 | Wendte et al. | 700/283 |
| 2009/0287380 A1 * | 11/2009 | Chervenka et al. | 701/50 |
| 2011/0015832 A1 * | 1/2011 | Hoyle | 701/50 |
| 2011/0022267 A1 * | 1/2011 | Murphy | 701/38 |

FOREIGN PATENT DOCUMENTS

DE    19835487 A1 *    2/2000
EP    578988 A1 *    1/1994

* cited by examiner

*Primary Examiner* — James Trammell
*Assistant Examiner* — David Testardi
(74) *Attorney, Agent, or Firm* — Patrick M. Sheldrake (57) ABSTRACT

A positioning sensor (e.g., GPS) allows a controller to determine the present location and orientation of the harvester on a map and to record the presently and previously harvested portions of a field. The controller uses the map and positional information to determine if the crop residue spray pattern from an adjustable spreader is returns substantially all the crop residue to the currently harvest portion and automatically adjusts the adjustable spreader to achieve an ideal residue spray pattern.

24 Claims, 11 Drawing Sheets

GPS CONTROLLED RESIDUE SPREAD WIDTH

TECHNOLOGY FIELD

The present invention relates generally to methods and systems for controlling the return of crop residue to a field, and more particularly to GPS control for automatic adjustment of an electrically controlled spreader mechanism.

BACKGROUND

A combine harvester is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, and flax or linseed. The waste (e.g., straw) left behind on the field includes the remaining dried stems and leaves of the crop having limited nutrients which may be, for example, chopped and spread on the field as residue or baled for feed and bedding for livestock.

The cut crop may be picked up and fed into the threshing and separating mechanism of the combine, typically consisting of a rotating threshing drum to which grooved steel bars may be bolted. These bars thresh or separate the grains and chaff from the straw through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material is returned to the field via a spreader mechanism.

When a harvester, such as a combine, harvests crop, the desirable crop (such as corn kernels for a corn crop) is separated from the remainder of the vegetable matter (e.g. the remainder of the crop plant which can include straw, chaff, husk, cob, etc, depending on the crop being harvested). This remaining vegetable matter is called "residue" or "crop residue". This residue is typically returned to the field by way of a spreader so that the nutrients can be reclaimed by the field. The spreader is a device at the rear of the combine that typically spreads the residue behind the combine in a substantial uniform manner.

While uniform distribution of residue is often desirable, such as when operating in the middle of a field, uniform distribution is not always ideal. For example, when a combine reaches a section of field where a portion of the cut width of the header does not encounter crop to be harvested (e.g. a portion of the header traverses a portion of the field that has already been harvested) there is no need to return residue from the area currently being harvested to the soil in the area that does not contain crop that is currently being harvested. In this instance, uniform distribution of residue across the entire path of the header is undesirable because the residue from the crop being harvested will be moved away from that portion of the field that contributed the residue. Repeatedly distributing residue from an area currently being harvested to an area that is not contributing to the residue will, over time, move nutrients from the top soil contributing to the residue to other parts of the field that may not be used to produce crop. This can create non-uniform soil conditions in future seasons or can spread nutrients away from the usable growing portion of the field, such as onto roads, into ditches, or anywhere else it may be undesirable to move residue. The prior art does not address this need.

Some prior art spreaders contain an adjustable or configurable mechanism to allow for non-uniform or variable width spread. An operator can use such a spreader to configure the spread of the residue behind a combine. For instance, an operator might configure the residue spread width to be with the cut width of the header that is being used for the current harvest. These spreaders generally require manual adjustment and have not been sufficient for providing dynamic, automatic, or real-time adjustment of the residue distribution.

As wider headers are introduced in the market into practice with harvesters, it becomes more important to have dynamically adjustable spreaders such that the residue from the harvester is distributed in a controlled window. The prior art not address this need.

SUMMARY

Embodiments of the present invention address and overcome one or more of the above shortcomings and drawbacks, by providing devices, systems, and methods for automatic adjustment of residue spread based on positional sensors. This technology is particularly well-suited for, but by no means limited to, agricultural tractors.

According to one embodiment of the invention, a system controls the residue distribution of a harvester. The system includes at least one positioning sensor, such as a GPS sensor and/or electronic compass. The system further includes at least one controller, such as a microcontroller, that receives positional information from the positioning sensor. The system further includes one or more maps stored in a memory that is accessible to the controller for recording portions of a field that have been newly and/or previously harvested by the harvester. The system further includes an electrically adjustable spreader for distributing residue in accordance with control signals for the controller. The controller controls the spreader to substantially control (e.g., limit) the residue distribution the portions of a field that have been newly harvested by the harvester. In this embodiment, the portion of the residue reaching other areas of the field may be substantially reduced and/or eliminated.

According to another embodiment of the invention, a method controls the distribution of crop residue by a harvester. The method includes receiving electronic positional information about the position of the harvester. The method further includes retrieving a map of an area being harvested from a memory. The method further includes automatically updating the map of the area to record a previously harvested area and a recently harvested area from the electronic positional information. The method further includes determining a current position of at least a portion of the harvester from the positional information. The method further includes determining if a current residue spray pattern distributes a portion of the crop residue to the previously harvested area. The method further includes dynamically adjusting a spreader mechanism via electrical signals to reduce the portion of crop residue that is distributed to the previously harvested area.

According to another embodiment of the invention, a method controls the distribution of crop residue by a harvester. The method includes receiving electronic positional information about the position of the harvester. The method further includes retrieving a map of an area being harvested from a memory. The method further includes automatically updating the map of the area to record a recently harvested area from the electronic positional information. The method further includes determining a current position of at least a portion of the harvester from the positional information. The method further includes determining if a current residue spray pattern distributes substantially all of the residue to the recently harvested area. The method further includes dynamically adjusting a spreader mechanism via electrical signals to substantially limit the distribution to the recently harvested area.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The above problems in the prior art have motivated the creation of the present invention. The present invention is directed to embodiments of an automatic control mechanism for adjusting the residue spray distribution, width, and general shape via a substantially realtime, automatic control system. Embodiments of the present invention utilize GPS, or other position information, to determine the desired characteristics of the residue spray and an electrically controlled spreader mechanism to implement the desired residue spray pattern.

Figure 1:
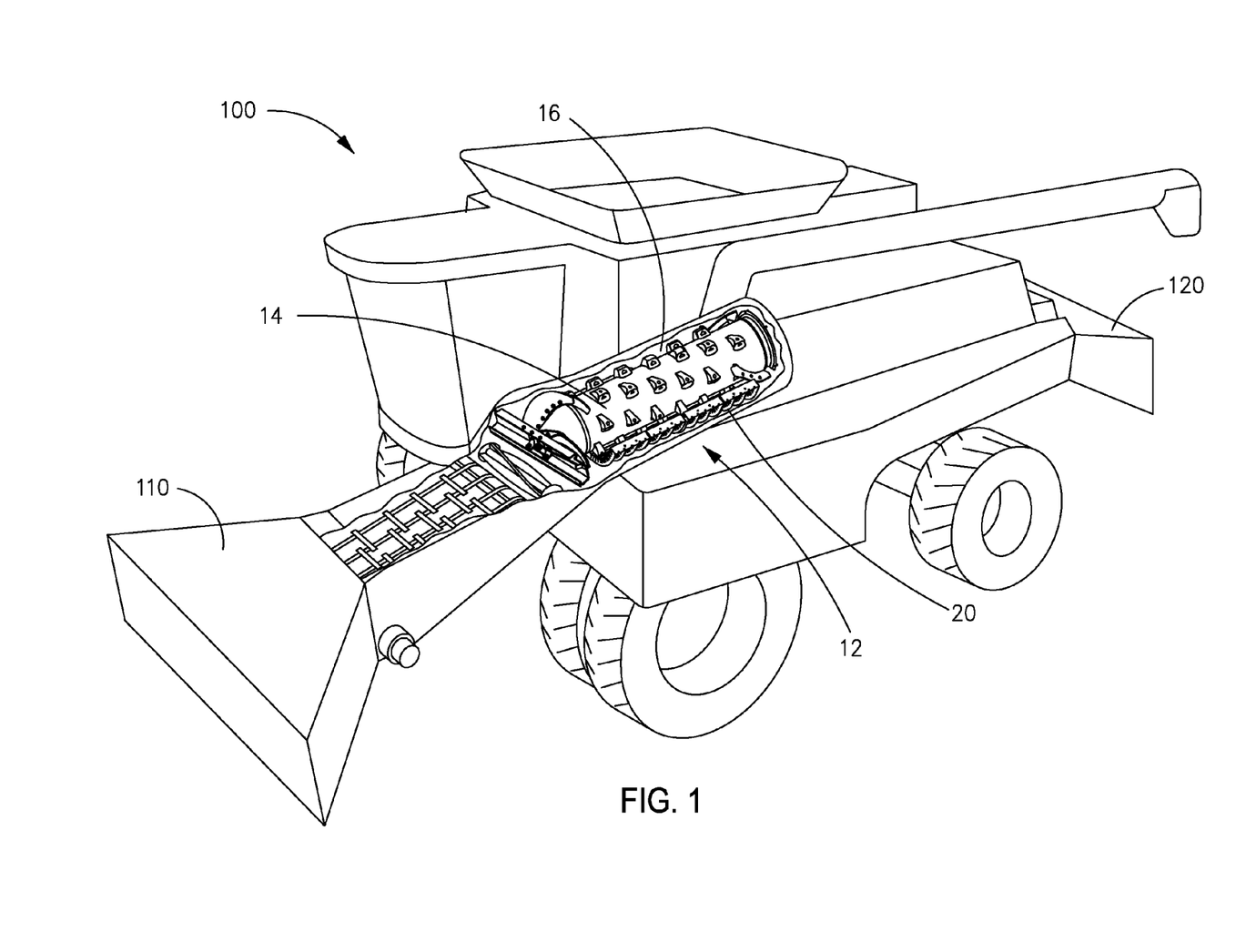
FIG. 1 is a perspective view of a harvester for use with the present invention.

FIG. 1 shows an exemplary agricultural combine 100, which may also be referred as a harvester throughout this specification. As shown in FIG. 1, the combine 100 can include a longitudinally axially arranged threshing and separation system 12, and a helical bar concave 20 within the threshing and separation system 12. The threshing mechanism may also be of any well known construction and operation. In some embodiments, the helical bar concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concaves 20 may extend circumferentially around the rotor 14 and the flow of crop may pass in the space between the spinning rotor and the concaves. As the crop material flow through the threshing and separation system 12, the crop material including, for example, grain, straw, legumes, and the like, will be loosened and separated from crop residue or waste such as, for example, husks, cobs, pods, and the like, and the separated materials may be carried away from the threshing and separation system 12 in a well known conventional manner. The present invention relates to an automated system and methods for determining the desired characteristics of the residue spread for returning the residue to the field.

Figure 2:
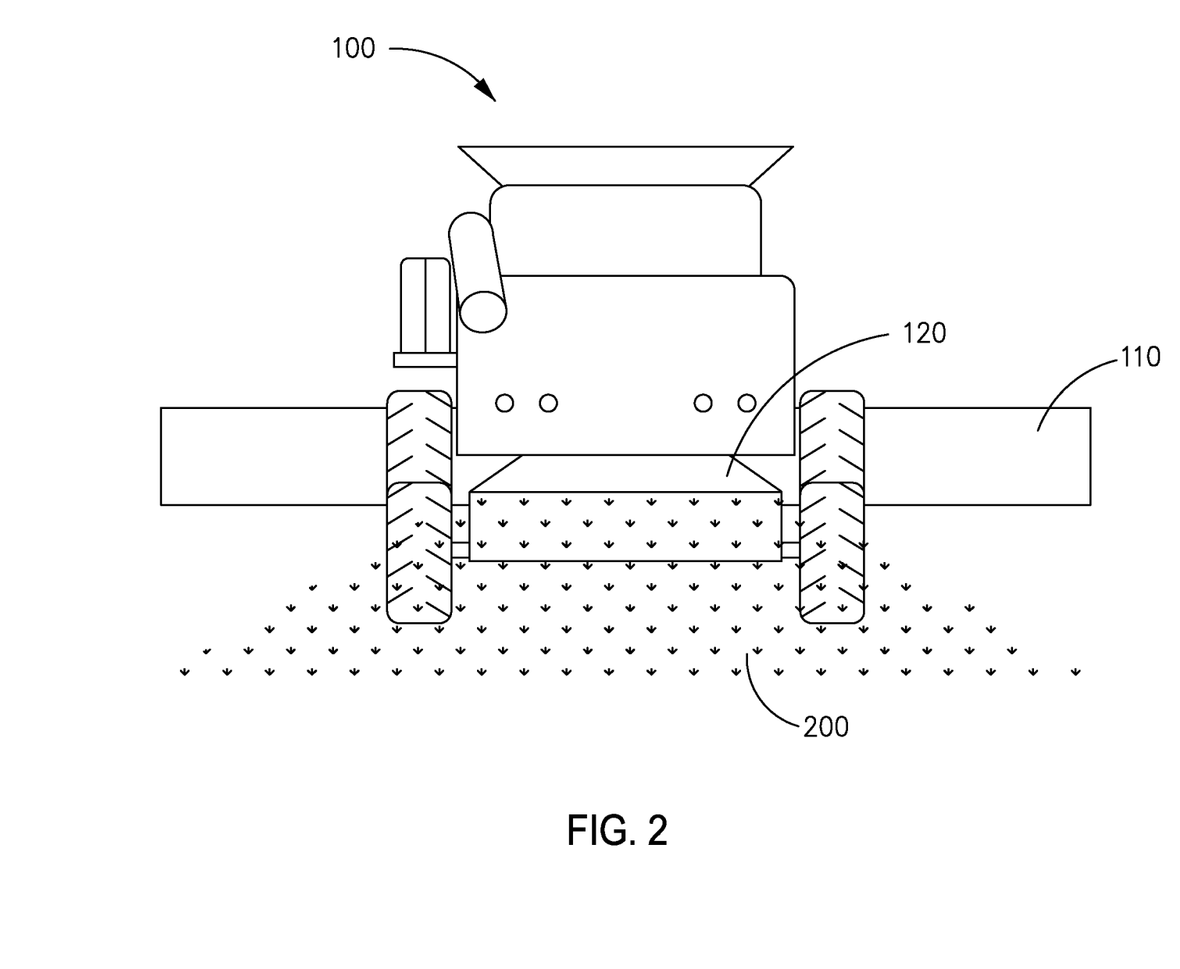
FIG. 2 is a rear view illustration a harvester showing an conventional residue spreader mechanism and residue spray.

FIG. 2 shows the rear view of a prior art harvester a spreader 120 in action. In this example the residue spread 200 is uniform, spreading in both directions of the centerline of the harvester 100 a substantially uniform spray. Embodiments of the present invention can control spreader 120 via electrical signals and parameters to adjust the shape and width of residue spray 200 based on positioning (e.g., GPS) and status information. For example, in some embodiments of the present invention, the spreader 120 can be adjusted to affect the symmetry of the residue spray 200, including, for example spreading all or substantially more residue to one side of the spreader 120 or the other.

Figure 3A:
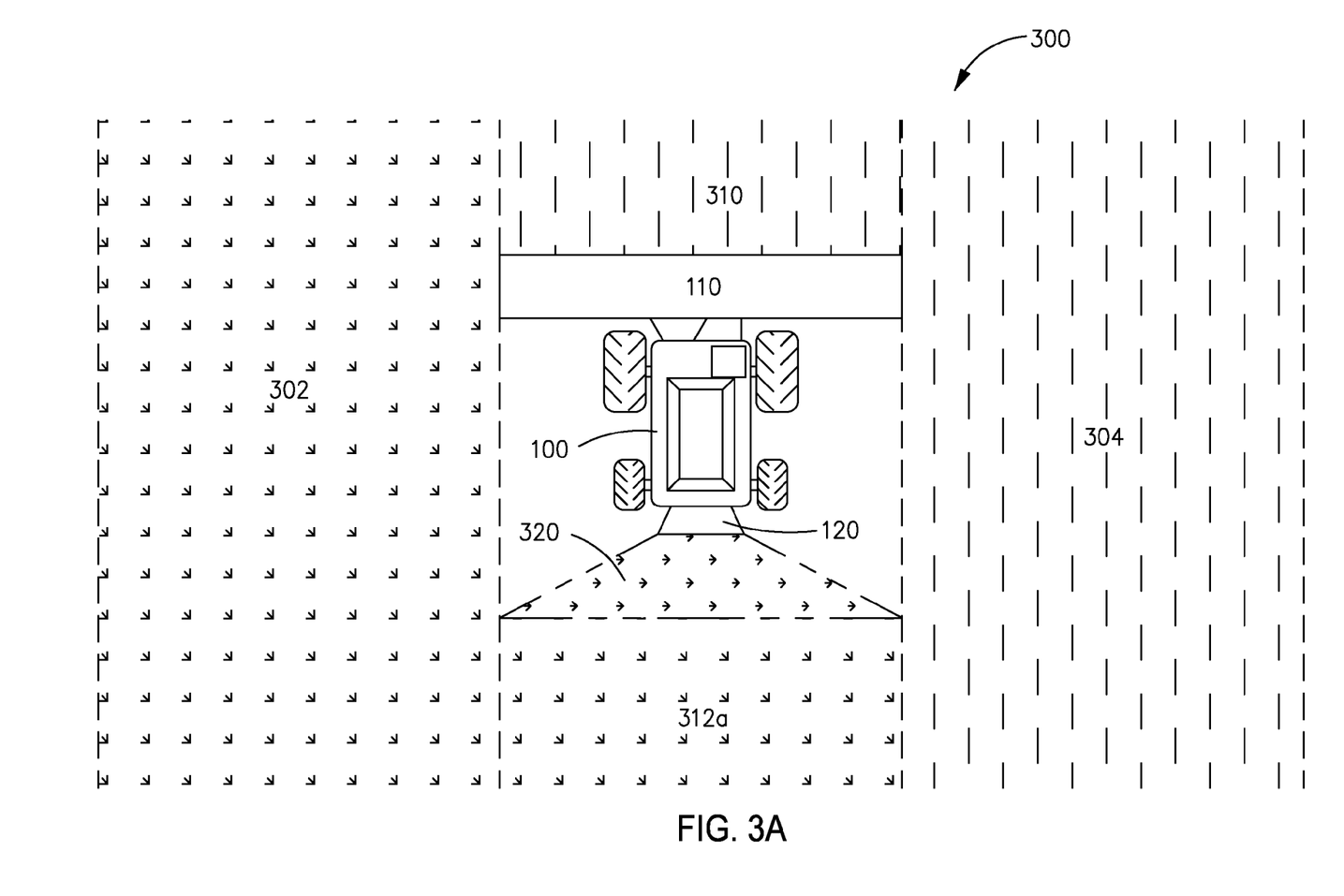
FIG. 3A is an aerial view of a harvesting scenario for use with the present invention.

FIG. 3A shows an example of the field being harvested where a uniform distribution of the residue spray may be desirable, such as in the middle of a fairly flat field. Harvester 100 harvests field 300 by making adjacent passes, using the header 110 to harvest crop as is traverses the field 300 with each pass.

Harvester 100, which can include a combine, drives forward in the direction of path 310 which contains unharvested, standing crop to be harvested on the current pass. Header 110 harvests the standing crop it encounters in path 310, and the combine 100 separates the crop from residue such as straw and chaff via mechanisms known to those skilled in the art, such as threshing. After the residue is separated by the harvester 100, the residue is returned to the soil via mechanical spreader 120, which creates a residue spray 320. The field portion to the left 302 includes a portion of the field where there is no crop to be harvested on the current pass, such as a portion of the field that has already been harvested on a prior pass, or a portion of the field which does not need to be harvested, such as an unplanted portion of the field 300. The portion of field 300 that is not harvested on the current pass 310, can include drainage areas, access roads, or portions of the field used for other purposes. If field portion 302 was harvested on a previous pass, it will generally include residue that was spread by the combine 100 on a previous pass and other matter that was not collected. Recently harvested area 312a contains residue that was spread by the combine 100 on the current pass and other matter that was not collected. The residue remaining in 312a is the result of the residue spray 320 passing over area 312a moments ago during the current pass. Area 304 contains standing crop to be harvested on a future pass.

In the example of FIG. 3A, the entire cut width of the header 110 is used for harvesting unharvested standing crop. Therefore, the entire cut width of the header 110 contributes to the volume of residue that is returned to the field 300 via residue spray 320. The situation shown in FIG. 3A may occur in ideal situations in which it is easy to align the header with unharvested crop, such as in the middle of a substantially flat field. In the scenario depicted in FIG. 3A, it is desirable that the residue spray 320 be uniform so that it is uniformly distributed across the area 312*a* to provide consistent and uniform distribution of nutrients to the top soil.

Generally, it is undesirable to distribute residue from the current pass via the residue spray 320 to field portions 302 or 304, as this will result in non-uniform movement of residue throughout the field 300. Residue spray 320 preferably deposits its residue uniformly to field portion 312*a*, because field portion 312*a* was harvested during the current pass. In this manner, as the harvester 100 travels along path 310 (and thus turns standing crop from path 310 to harvested crop as in area 312) the residue created will generally be returned to the same part of the field that contributed to it. This prevents unnecessary removal of nutrients in the residue from the path 310.

FIG. 3B shows an example of a scenario where only a portion 110*a* of the cut width of the header 110 is used to harvest standing crop. This situation can occur, for example, at the edge of a field or where aligning the header 100 with unharvested crop 322 is difficult, such when the features of the field are not ideal, such as in hilly terrain. For ease of reference, operation can be described with reference to the boundary 303 of unharvested standing crop 322 to be harvested and the area not containing crop 302. Harvester 100 operates as described with reference to FIG. 3A.

The field portion 302 includes a portion of the field where there is no crop to be harvested on the current pass, such as a portion of the field that has already been harvested on a prior pass or a portion of the field which did not need to be harvested, as previously described. Harvester 100 travels along harvester path 310, which includes a portion containing crop to be harvested 322 and a portion that does not contain crop 302 (which is contiguous with the area to the left of path 310 that also lacks crop to be harvested.) The portion 302 of the field may be where crop has already been harvested or where no crop was available to be harvested or where no crop was planted.

In the example shown in FIG. 3B, only a portion 110*a* of the cutting width of the header 110 encounters standing crop to be harvested. Header portion 110*a* is the portion of header 110 that traverses standing crop field portion 322 as the harvester 100 moves along path 310. Therefore, header 110 will only harvest crop from portion 322 and will not harvest crop from portion 302. Similarly, only portion 322 will contribute substantial residue to be spread by spreader 120.

In this scenario, it is desirable to substantially return residue to field portion 312*b*, which corresponds to the portion of the field being harvested on the current pass 322. By sending the residue substantially to the field portion 312*b*, substantially all of the residue contributed by the harvested crop is returned to the portion of the field that contributed residue. Spreader 120 creates spread 330 which is distributed substantially to a portion 312*b* of the rear of harvester 100 such that the residue spray 330 is returned to area 322 once the crop in area 322 has been harvested as the harvester 100 travels along path 310 (thereby turning area 322 to 312*b* as the harvester passes). This will mitigate long-term effects of removing nutrients from the field and can contribute to more uniform crop yield over field 300 and reduce the expense of adding nutrients to the top soil, such as through the addition of fertilizer.

In some embodiments, residue spray 330 distributes residue uniformly across the width of area 312*a*, such that the width of the spray is substantially the same as the width of the portion 100*a* of the header 100 that harvests crop. In some embodiments, the width of residue spray 330 can be based on the width of the header portion 110*a* as it passed over the current location of spreader 120. The distinction of these two alternate embodiments will become apparent with reference to FIG. 3C.

FIGS. 3A and 3B show scenarios where the spread width of the residue spray 320 and 330 does not substantially change as the harvester moves in the direction of the path 310. FIG. 3C shows a scenario where the width of the crop being harvested changes as the harvester moves along its path 310. This area can occur for example when the harvester 100 reaches the end of path 310 such as when the harvester reaches the edge of the field or where the field is hilly or contains non rectangular features.

In this situation, previously harvested field portion 302 intersects path 310 as the header 100 begins to cross boundary 303. As header 110 encounters the previously harvested field portion 302, the size of the portion 110*a* of the header 110 that encounters unharvested crop 322 changes as the harvester 100 crosses boundary 303. In this example, the width of header portion 110*a* is reduced as header 100 crosses boundary line 303 into previously harvested section 302.

It is desirable to limit the residue spray 335 from being distributed into the portion 302 to limit moving residue contributed by currently harvested area 322 to an area that did not contribute to the residue, such as areas 302 and 309. Likewise, section 312*c* contains field portion that recently contributed to the crop and residue of the current pass. It is desirable to return residue to section 312*c* via adjustable residue spray 335.

In some embodiments, the width and distribution of the residue spray 335 will be dynamically adjusted to substantially match the shape of recently harvested section 312*c*. Therefore, as harvester 100 moves further in to section 302 the distribution of the residue spray 335 can be adjusted such that the spray width is reduced and contributes more residue to the right than the left of harvester 100. The present invention achieves dynamic, real-time, substantially automatic adjustment of the characteristics of residue spray 335 by positional and status sensors to limit the spray to portions of the field 300 that contribute to the residue being sprayed.

The present invention utilizes positional sensors, such as GPS sensors, to determine the location and direction of the harvester. In some embodiments the accuracy of GPS sensor can be within feet or fractions of an inch. Applying a GPS sensor to the situation shown in FIG. 3C, the GPS sensor can determine that the header 110 is traveling along path 310 and intersecting previously harvested section 302. The present invention can then determine how to adjust the spread width of the residue 335 to maintain uniform distribution of residue across the field 300 during the harvest.

Figure 3B:
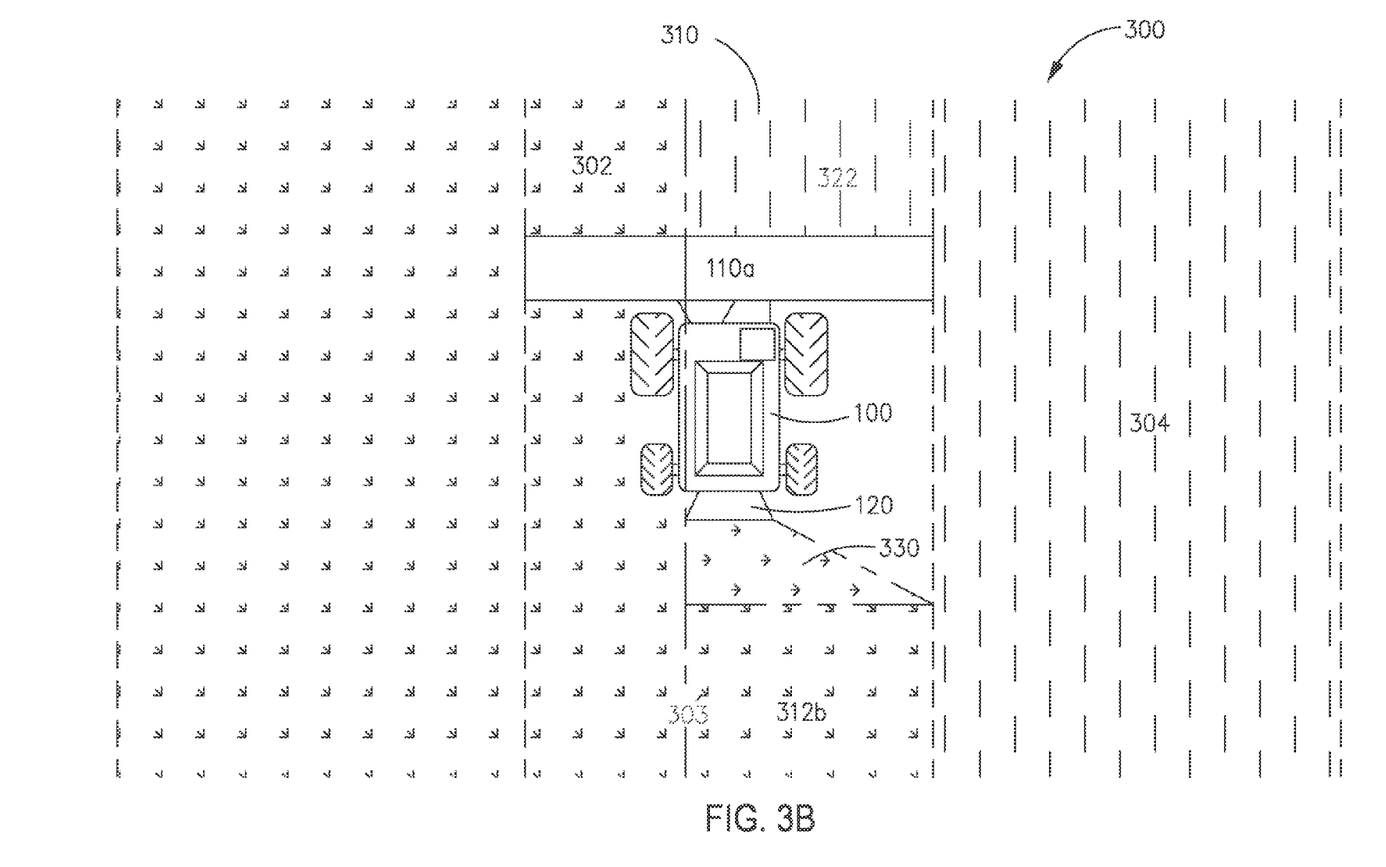
FIG. 3B is an aerial view of another harvesting scenario for use with the present invention.

In some embodiments, the algorithm used to determine the ideal residue spray distribution may include a rule that the spread width of residue spray 335 should substantially match the portion of the header that is currently encountering standing crop being harvested 110*a*. This algorithm could determine the current header portion 110*a* that encounters standing crop either by comparing the current location and direction of the header 110 as determined by a positional device such as a GPS an/or electronic compass, and a stored map that includes information that reveals that section 302 has been previously harvested or otherwise does not contain crop to be harvested. In this embodiment, the algorithm could determine the current width of the portion 110*a* of the header 110 currently harvesting crop, and immediately begin adjusting the spray pattern and width, or adjust this width with a delay. In many examples of this embodiment, the spray pattern 335 may begin reducing (e.g. such as shown in spray pattern 330 in FIG. 3B) before the spray pattern encounters boundary 303.

Figure 3C:
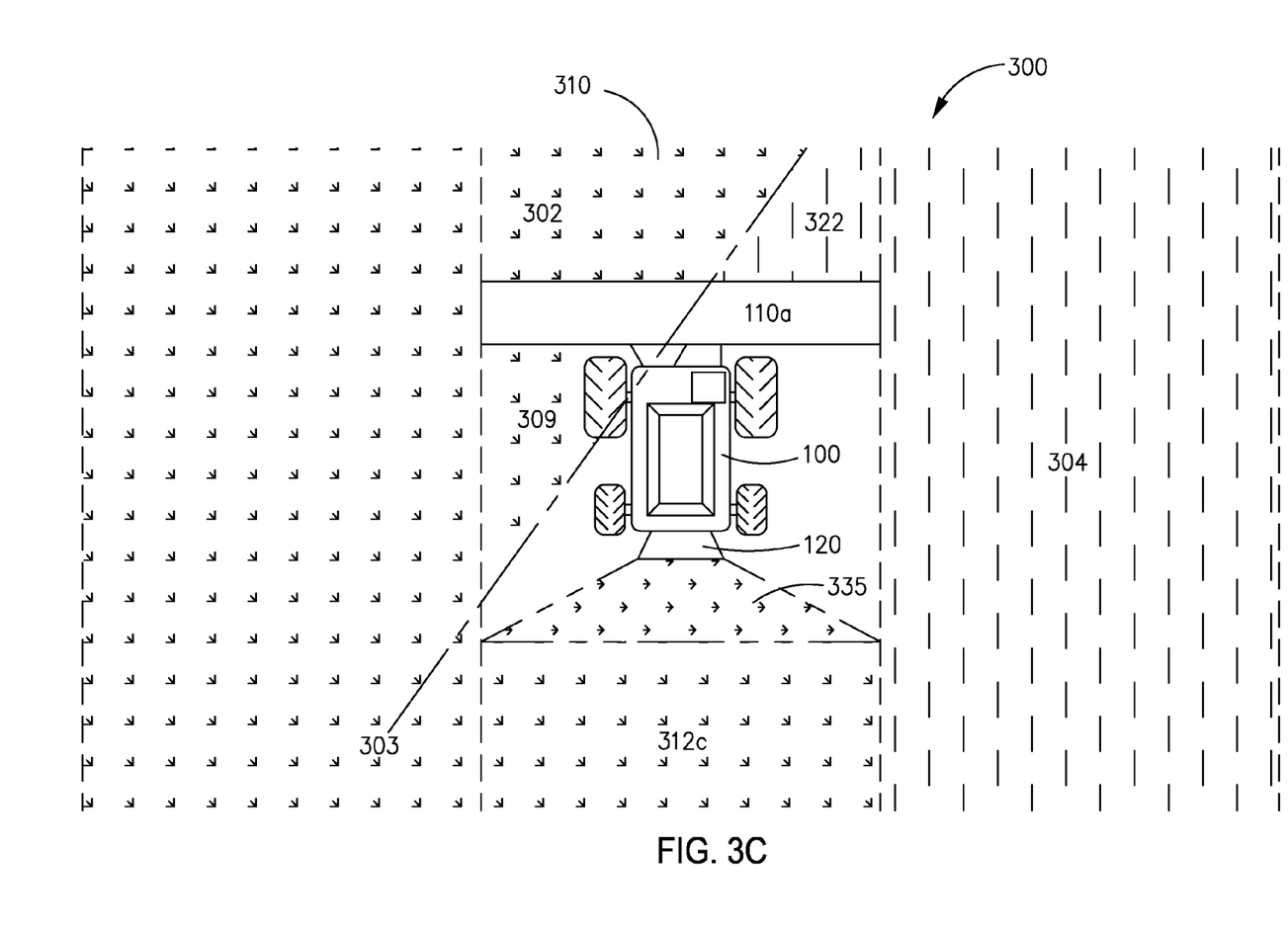
FIG. 3C is an aerial view of yet another harvesting scenario for use with the present invention.

In some embodiments, the algorithm can determine the location and orientation of the spreader 120 and adjust the spray width 335 such that the spray width 335 corresponds to a uniform distribution over substantially the entire section 312c. In this algorithm, positional information can be recorded such that the path 310 traversed by header 110 is recorded in relation to a map. The map may be automatically updated as the harvester moves, such that the map contains substantially real-time information indicating that section 302 does not contain crop to be harvested. In this example, the current spray width can be compared to the width of header portion 110a determined moments ago when the header 110 passed over the current location of spreader 120. In this embodiment, the residue spray 335 would begin reducing width and changing distribution approximately when the residue spray 335 encounters section 309, which corresponds to the intersection of path 310 and previously harvested section 302 (e.g. boundary 303).

Figure 4:
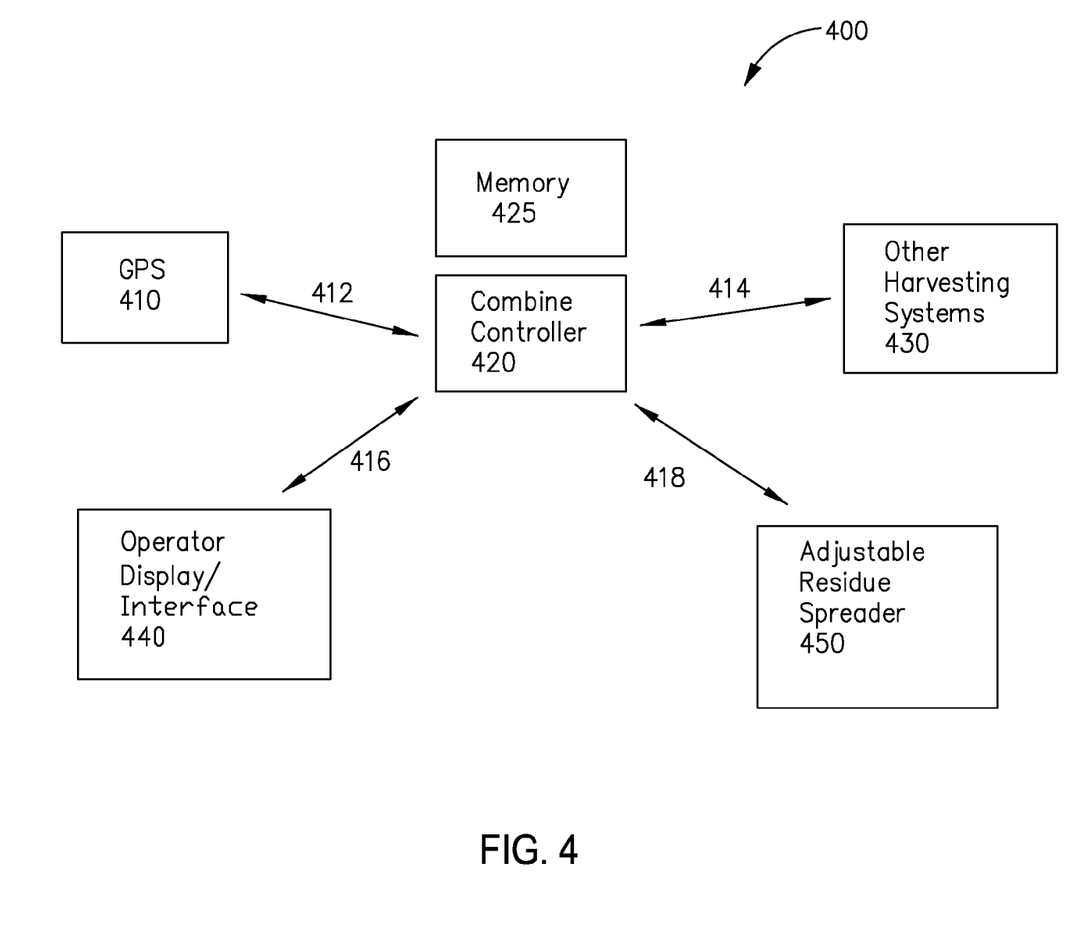
FIG. 4 is a system diagram of an embodiment of the present invention for adjusting the residue spreader based on substantially real-time GPS and status information.

FIG. 4 depicts system 400 for using GPS or other positional sensors to determine the proper spread width for given location and direction. GPS unit 410 determines the location and orientation of the harvester on the field. GPS 410 can operate in the same manner as well-known GPS sensors in the art. Generally, GPS operates by receiving positional signals from multiple GPS satellites. GPS sensor 410 then uses these signals to determine the exact location of the sensor on the earth. The accuracy of the GPS sensor 410 can be within feet or within less than an inch.

In some embodiments, the GPS 410 determines the location of the harvester 100, while other sensors such as an electronic compass sensor can determine the direction of the harvester 100 and by extension the location and orientation of header and the spreader. In some embodiments GPS unit 410 can include a field-based positioning sensor, which may act substantially like GPS with land-based positioning transponders. In some embodiments, the orientation of the harvester can be determined using recent GPS positions to determine direction of travel and orientation. In other embodiments, multiple GPS sensors can be used to determine the location and orientation of the harvester 100. It should be appreciated that the GPS sensor need not be a dedicated, stand-alone unit. For example, one might use the positional data supplied by a mobile handheld device possessed by the operator. Today, many mobile devices, such as smart phones include GPS sensors and may further include electronic compass sensors, For example, positional and orientation information may made available by the operator's cell phone by way of some electrical interface, which may include a wireless interface, such as Bluetooth.

GPS sensor 410 can provide the current position, trajectory and orientation to combine controller 420, or may provide sensor information that the combine controller 420 can use to calculate these values. GPS 410 can send sensor information to combine controller 420 in the form of CAN signals a CAN bus 412. In alternative embodiments other signals such as digital signal or analog signals or signals comply with any desired standard can be used. In some embodiments, CAN signals are used to take advantage of existing CAN busses in the harvester 100. This also allows the system 400 to be integrated with other systems onboard the harvester 100 and allows simple standards-based electronic control. It should be noted that signaling path 412, which may be a CAN bus, can include control signals sent from combine controller 420 to GPS 410.

Combine controller 420 can be a one or more microcomputer, microcontroller, or processor including appropriate peripherals such as memory, power source, data buses, and other circuitry appropriate for carrying out its controller functionality. Combine controller 420 can use memory 425 to store data (e.g. stored maps, updated maps, configuration files, user profiles, etc) or instructions (e.g. applications, algorithms, or programs used in the operation of the present invention) for use during operation of the system 400. Memory 425 is accessible to controller 420 and can be a local RAM, ROM, flash memory, hard drive, solid state storage, removable memory, or any combination or subset thereof.

Combine controller 420 can be a single unit that is used for multiple systems within harvester 100, besides the system 400 of the present invention. For example, combine controller 420 may be part of a larger electronic control circuit that may be responsible or ignition systems, driving systems, harvesting systems, entertainment systems, climate-control systems, or a number of other systems that may be used in harvester 100.

At least one map of the field being harvested can be stored in memory 425. These maps can include a previously defined map that may be downloaded or created electronically before the harvester 100 harvests the field 300. Alternatively, the map may include reference points for waypoints that may be set manually by the operator of combine 100. For example, the map stored as part of system 400 can be detailed map based on geological surveys, satellite imagery, or created for the purpose of use with system 400. This map may include detailed information about the location of crops to the harvested and/or features that are known to exist in the field, such as roads, drainage channels, hills, depressions, etc. The map being used by system 400 could alternatively be a simple series of waypoints that are used to track the progress of harvester 100 as a harvests in 300. In some embodiments, the map is created on the fly by the operator by setting waypoints as the harvest progresses. By using GPS 410 and a map of the field, combine controller 420 can track where the harvester 100 is in the field and where the harvester 100 is relative to portions of the field 300 that have already been harvested, such as portion 302, and/or relative to portions of the field 300 that have not been harvested, such as portion 304.

Combine controller 420 can also accept signals regarding harvesting status from other harvesting systems 430. Examples of other harvesting systems that can supply signals to combine controller 420 include sensors that determine whether header 110 is engaged and currently being used to harvest crop, sensors that determine the type of header being used, sensors regarding the condition or quality of the crop being harvested, or any other sensors that supply information for combine controller 420 to determine how to adjust the residue spread. Combine controller 420 and the other harvesting systems 430 can communicate via electrical signals in path 414 which can include analog or digital signals or a CAN bus, which can be shared amongst any subset of the components in FIG. 4.

In some embodiments, information regarding the status of the header, the condition of crops or other harvesting information can be imported from memory 425 and/or graphical operator interface 440. The operator of combine 100 can supply configuration information such as harvesting information, status information, or information about desired residue spray profiles via interface 440. Alternatively, at least some of this information can be supplied to combine controller 420 files stored in memory 425, such as configuration files, data files, or user profile files. The graphical operator interface 440 can also include manual settings that can be used to override the GPS-based settings to manually control the residue spray with profile. Graphical operator interface 440 can include a screen such as a CRT, LCD, LED, OLED, AMOLED, or other appropriate screen. Graphical operator interface 440 can further include input devices such as buttons, keypads, touch screens, or the like.

Graphical operator interface 440 and combine controller 420 communicate via electronic signals such as digital or analog signals or CAN bus signals over signaling path 416. This allows the combine controller 420 to receive information from the operator of combine 100 or to display information to the operator, such as sensor information, camera information, status information, configuration information, or information regarding current sensor values. In some embodiments, information sent to the graphical operator interface 440 includes a graphical map displaying a map of the field being harvested as well as portions of the field 300 that have been harvested (e.g. 302) and those portions that have yet to be harvested (e.g. 304) as well as current location and orientation of the combine 100. The information displayed can also include status information about the combine including, for example, current direction, speed, temperature, grain capacity, environmental information, and/or mechanical/engine status information. The information displayed to the operator, including combine status information, can be gathered from other controllers or other sensors that are not shown in FIG. 4.

Combine controller 420 stores the configuration and status information received from graphical operator interface 440 and other harvesting systems 430 and processes and stores this information. Combine 420 applies an algorithm to the GPS data received from GPS 410 along with the status and control information received from 430 (or from memory) to determine how to adjust the residue spread as described throughout this specification.

Combine controller 420 communicates with adjustable residue spreader 450 via electrical signals 418 which could include digital, analog or CAN bus signals. Adjustable residue spreader can be used as spreader 120 on the combine 100.

Once the combine controller 420 has determined the appropriate spray width for the residue, combine controller 420 interacts with the electronically adjustable residue spreader 450 over signal path 418. In some embodiments, this includes an analog control signal that adjusts the adjustable residue spreader. The adjustment to the adjustable residue spreader can be in the form of changing the orientation or the speed/movement of parts used in a spreader 450, or by making any other adjustment to an electronically adjustable spreader 450 that would be useful for creating a residue spray pattern consistent with the ideal spray pattern determined by the combine controller 420. In some embodiments, combine controller 420 can receive electronic signals from the electronically adjustable spreader 450, such as a voltage signal that can be used to determine the current status of the adjustable residue spreader 450. For example, this signal received from combine controller 420 via signal path 418 can include information about the current load on the spreader, current speed of portions of the spreader such as rotating elements, or the current orientation of the deflectors within the electronically adjustable spreader 450. Electronically adjustable spreader 450 can also include a control circuit for interacting with combine controller 420 and making adjustments to the spreader parameters pursuant to the control signals received from the combine controller 420.

Figure 5A:
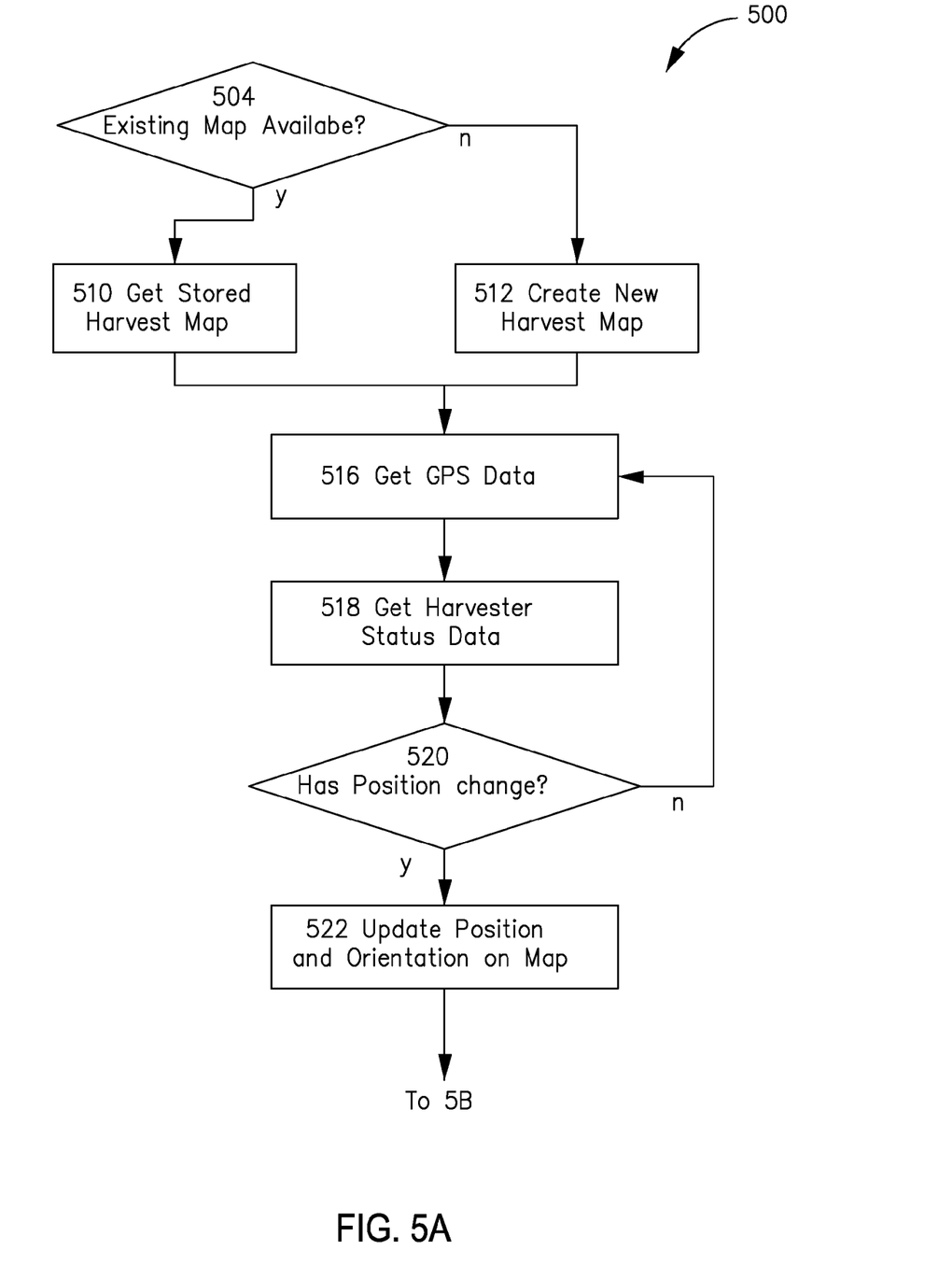
FIGS. 5A and 5B comprise an exemplary flow diagram for an embodiment of the GPS controlled residue spreader mechanism.
Figure 5B:
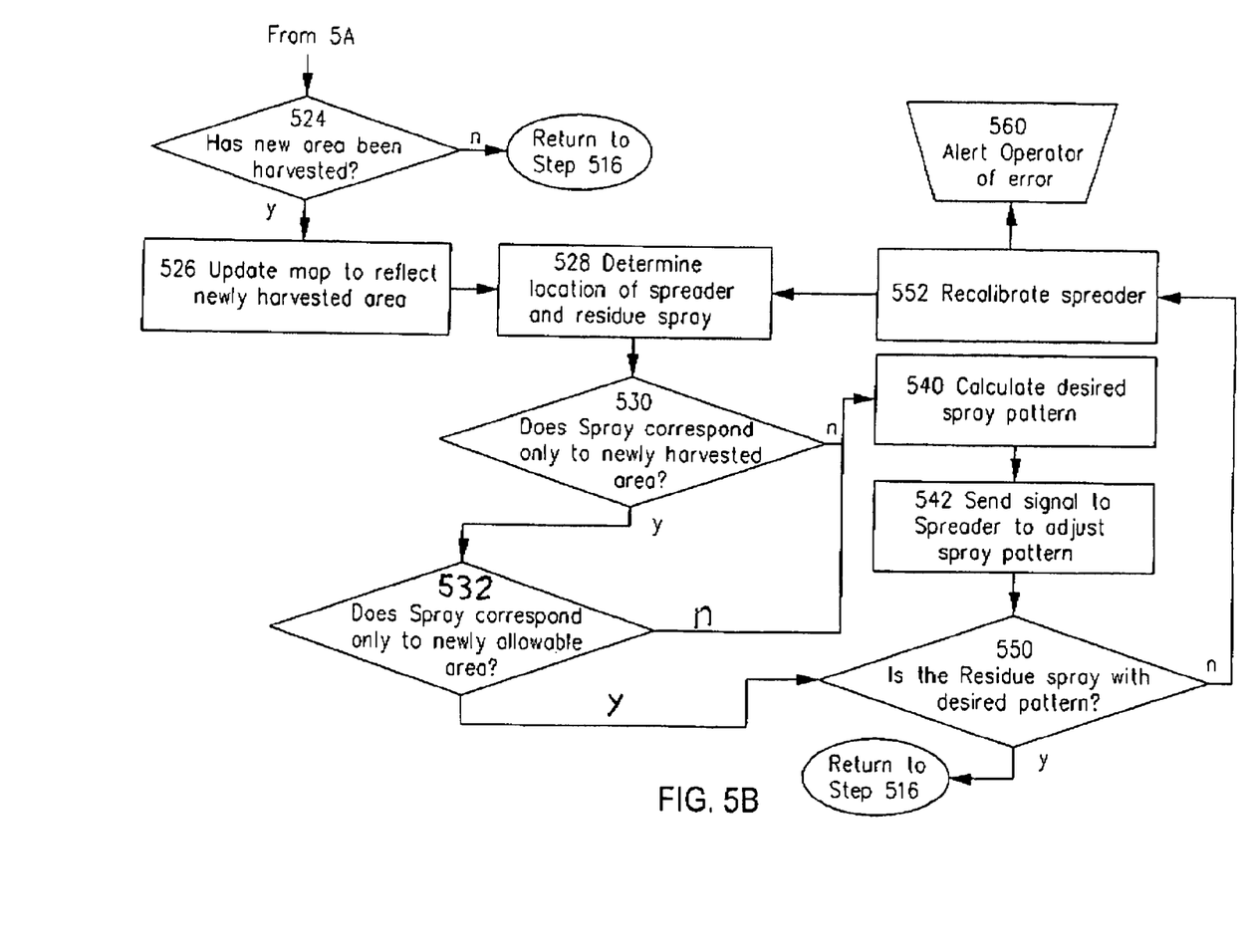

FIG. 5 depicts the steps taken during the operation of an embodiment of system 400 for adjusting the residue spreader spray pattern. When the harvester begins harvesting a field, the system 400 determines if an existing map is available at step 504. If a map is stored in memory 425 that is accessible to combine controller 420, the system 400 retrieves the map of the harvest from his memory at step 510. As previously discussed, an exemplary map may include topographic features of the field 300, the location of crop to be harvested, the location of crop that has been previously harvested, or important waypoints. This map may also be capable of display to the operator via operator display interface 440.

The map stored in memory 425 may be a map that was created by another computer, such as a PC or server. In some embodiments, that map of the field stored in memory 425 is a map that was created or edited by the combine controller 420, such as during a previous harvest, planting, or any other previous pass of the area. In some embodiments, the map stored in 425 may be shared between multiple harvesters such as via removable memory or wirelessly synchronized memory. In these embodiments, other combine controllers or computers may have edited the map during previous harvests, planting, or passes of the area. Previous edits to the map may include manual input from an operator, such as supplying information via a PC or computer about crop yield determined during the growing season.

If no map of the harvest area was previously loaded into memory 425, the system 400 may create a new harvest map from scratch or from pre-existing map information at step 512. For example, in some embodiments, the system 400 can locate a general map of the area without information about this particular harvest (e.g. lacking information such as the location of crop to be harvested or boundaries of the field). An exemplary map may be a portion of a generic pre-loaded map of the area as a whole (e.g. included by the manufacturer of the GPS unit). Alternatively, system 400 can create a new map at step 512 that will use waypoint information that is created as the operator moves the combine 100 about the field during the harvest. This new map is then loaded into memory 425.

The system 400 gets GPS data from the GPS module 410 to determine its current location at step 516. This GPS data can include positional, as well as trajectory information, and orientation information to determine a model of the location and movement of the combine header 110 and spreader 120.

Once GPS data is obtained, at step 518 the system 400 proceeds to gather harvester status data such as configuration information or sensor information that may be obtained from Harvester systems 430 or from the operator. The combination of GPS data gathered at step 516 and Harvester status information at 518 allow the system 400 to determine the location and orientation of the header and spreader, including the status of the header (e.g. if it is enabled for harvesting, such that moving the combine will or will nor result in harvested crop). The status information can also help determine the size of the header to accurately determine how much of the field will be harvested as the harvester 100 moves.

Once this information has been gathered, at step 520 the system 400 determines whether there is a change of position or status of the combine. If for example, the harvester 100 has not moved, the system 400 will return to step 516 and continue to gather GPS and status information.

At step 522, the system 400 updates the position and orientation of the harvester 100 on the map as a result of the detected movement. The system 400 can update the display of map to the operator via operator display interface 440. The system 400 can also update stored data about the current position, orientation, trajectory and status of the harvester 100.

If the harvester 100 is moving or there has been a change in status of the harvester, the system 400 will determine what portion (if any) of the crop in the field 300 is being harvested at the moment. At step 524, the system 400 determines if a new area of crop has been harvested since the last check. If no new area of crop has been harvested then the system 400 returns to step 516 to collect GPS and status information. Examples where the position has changed at step 520 but no new area of crop has been harvested, at step 524, may include instances where the combine moves without putting the header down in harvested mode or where the combine move over an area of the field known not to have any growing crop available for harvest, such as area 302.

In some embodiments, where a new map was created at step 512 or where the system 400 does not know if any crop is available for harvesting in the area, the system 400 can record the current path onto the map and note that the harvester 100 has traversed this area in a harvesting mode. This will allow future traversals of the current area to be treated as traversing an area 302 that lacks crop to be harvested.

At step 526, the system 400 updates the map stored in memory 425 to reflect that the harvester has newly harvested the area being traversed 312 based on the GPS and status information. For example, the map may be updated to indicate that this area has now been harvested. This will enable the system 400 to take into account that this area has previously been harvested and adjust the residue spread pattern accordingly during future passes.

At step 528, the system 400 uses information from the GPS and status information to determine a location and orientation of the spreader 120 and the corresponding, current residue spray pattern.

At step 530, the system 400 determines whether the current spray pattern corresponds to newly harvested crop areas. For example, if the harvester is operating in the scenario depicted in FIG. 3A, the system 400 at step 530 when determine that the current spray pattern 320 corresponds substantially only to newly harvested crop area 312a. In another example, such as that shown in FIG. 3C, the system 400 will determine that the spray pattern 330 no longer corresponds substantially only to newly harvested crop as the spray crosses boundary line 303. This is because in the example shown in FIG. 3C the portion 110a of the header being used to harvest the crop is changing as the combine crosses boundary line 303.

At step 532, the system 400 determines whether the current spray pattern corresponds to allowable areas for spraying residue. For example, an operator might choose a certain portion of the field to reduce the spray area. Information used in step 532 can include information from a configuration file or from operator input. For example the operator may manually choose from the cab of harvester 100 to reduce the spray to certain areas, such as near roads, ditches, or other features encountered while harvesting in the field.

If the result of step 530 or 532 indicates that the current spray pattern does not meet the desired spray pattern criteria, the system 400 proceeds to step 540. At step 540, the system 400 calculates a new spray pattern to use. For example, turning to the scenario depicted in FIG. 3C, as harvester 100 crosses boundary line 303, the system 400 will calculate a desired spray pattern that will be reduced incrementally on the left side for each pass of the system 400 as harvester 100 moves across boundary line 303. The algorithm used to calculate this desired spray pattern may be any algorithm described herein or as determined by the implementer of system 400 based on criteria that will be apparent to one of ordinary skill in the art. In some embodiments, the algorithm used at step 540 substantially limits the residue distribution the portions of a field that have been newly or recently harvested by the harvester. In some embodiments, the algorithm used at step 540 substantially reduces the portion of crop residue that is distributed to the previously harvested area.

In some embodiments, the calculation at step 540 takes into account the following rules, any number of which can be used in various embodiments. When the system 400 begins operating in an automatic mode, the default spray width is the same as the cut width of the header. When the harvester 100 traverses a field portion 302 believed not to contain residue, the spreader mechanism 450 will not be completely stopped, so as to prevent clogging of the threshing and spreader systems. Furthermore, when the header is harvesting, the system 400 will not completely stop the spreader 450, so as to prevent clogging.

At step 542, the system 400 determines what signals to send to an electrically electronically adjustable spreader 450 based on the newly calculated spray pattern at step 540. For example, the system 400 may send signals adjust the speed of a rotating portion of the spreader 450, such that the width of the residue spray is reduce or that the spray pattern shifted to one side or another of a harvester 100.

At step 550, the system 400 observes signals from the spreader 450 to determine the status of the current spray pattern. For example, these signals may include sensor signals which may be digital or analog as depicted in signals 418, or may be based on observing the electrical load components of the spreader 450. Sensors or load signals may indicate that moving components within spreader are not moving as expected. For example signals may indicate that a portion of the spreader is getting clogged and thus may require adjustment to the signals controlling the spray.

If signals acquired from signal path 418 indicate that the spray pattern is not operating in a manner expected at step 550, the system 400 may recalibrate the spreader at step 552. Recalibration may include, for example, adding voltage, current, or sending more power to spreader or adjusting parameters accordingly. Alternatively or additionally, the operator may observe that the spray pattern is not operating in a manner that the system 400 expects, such as by visual inspection. For example, if the system 400 believes that the current spray width is the same as the cutting width as the header, but the observed spray width is greater or less than this width, the operator may adjust parameters for the spreader until the spray pattern is optimal and is operating as expected by system 400. In some embodiments, if a problem is observed at step 550 or if multiple passes through a recalibration step 552 occur, the system 400 may alert the operator such as by sending a message to the operator's screen 440. This alert will allow the operator to override the system 400 or to make adjustments to parameters accordingly. Once the spreader 450 has been calibrated step by 552, the system 400 can return to step 528 to continue adjusting the spreader until the spreader sprays residue in the manner expected.

If no problems are noted with the spray pattern at step 550, the system 400 will return to step 516 and again acquire GPS and status information to determine if a new adjustment to the spreader 450 is necessary.

In some embodiments the steps depicted in FIG. 5 are performed by the combine controller 420 without assistance from the operator. These embodiments may include one or more electronic systems and one or more microcontrollers or processing units. FIG. 5 is merely one illustrative embodiment of the operation of the system 400. Steps performed by system 400 can include other steps, a subset of the steps 500, a different order of steps, or any variation that can be appreciated by one having ordinary skill in the art based on criteria suitable for a chosen application.

Figure 6A:
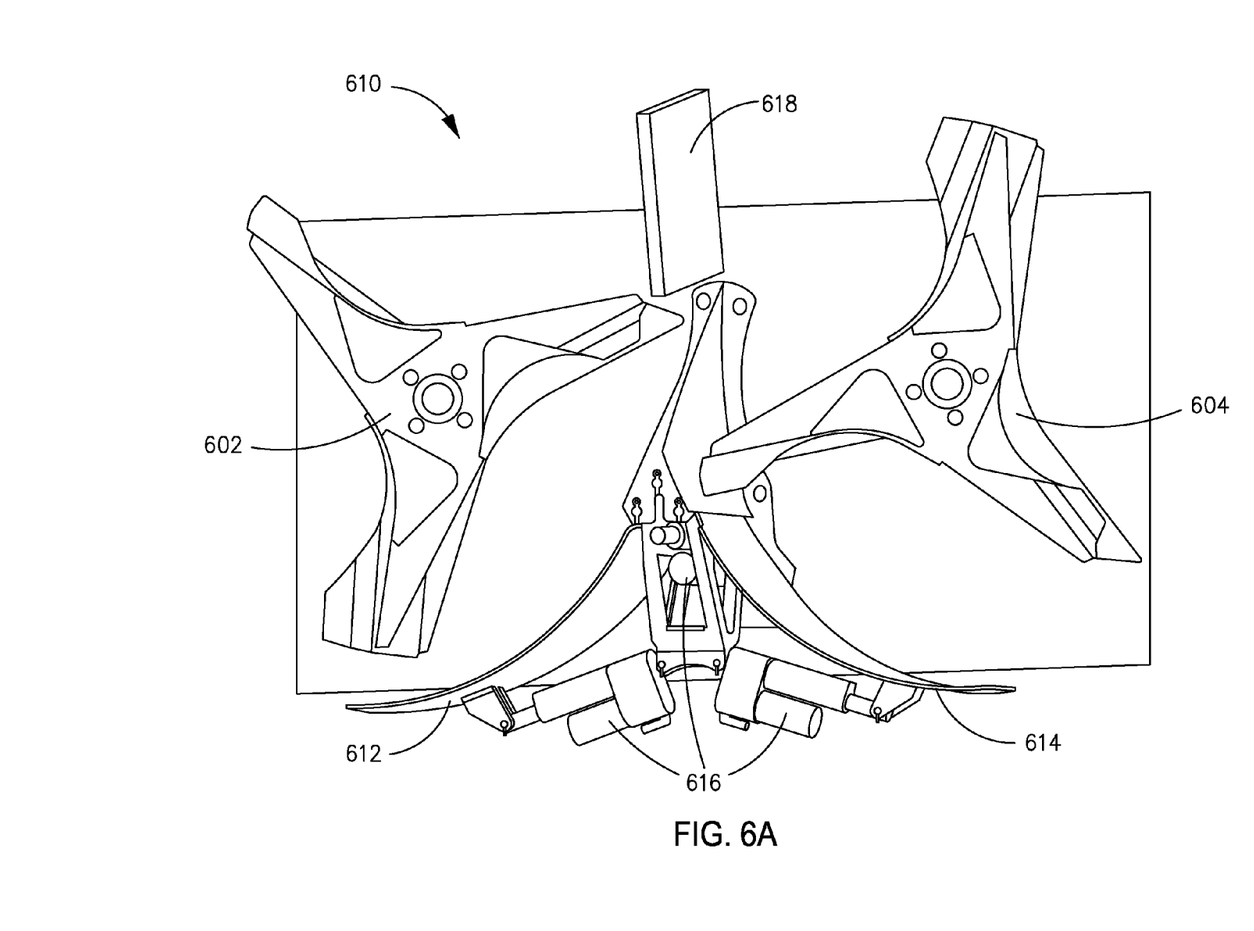
FIG. 6A is a rear perspective view of an exemplary embodiment of an adjustable spreader.
Figure 6B:
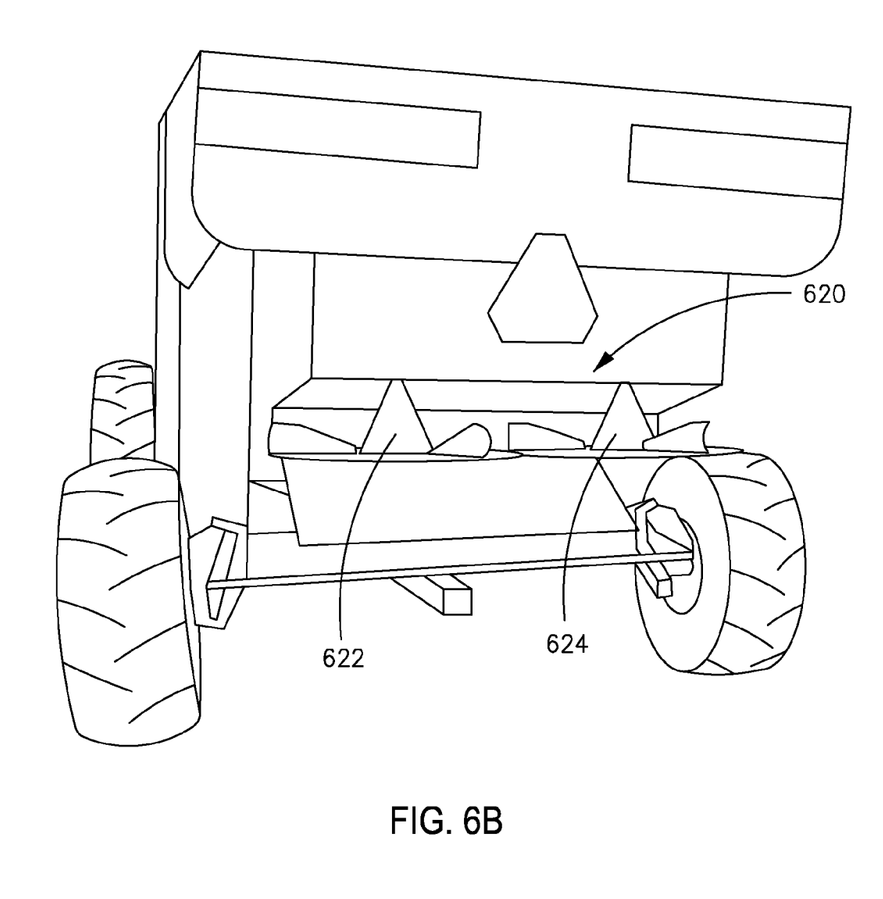
FIG. 6B is a rear perspective of another exemplary embodiment of an adjustable spreader.
Figure 6C:
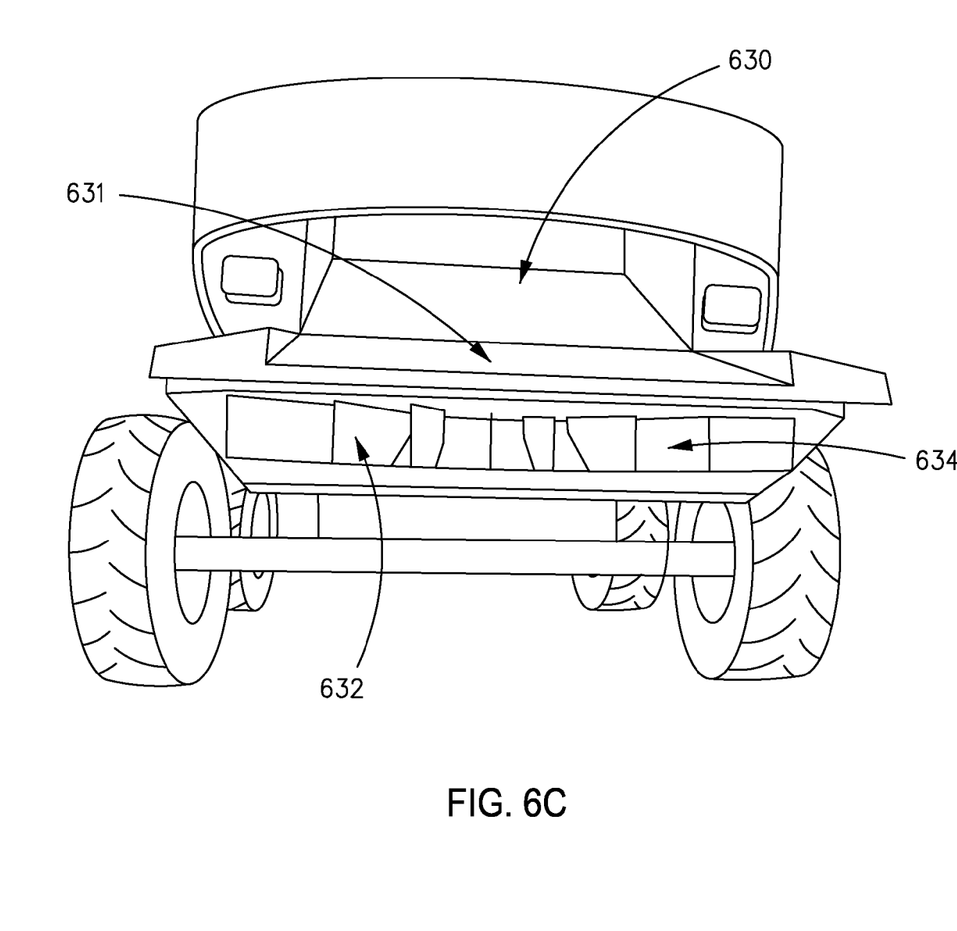
FIG. 6C is a rear perspective of yet another exemplary embodiment of an adjustable spreader.

FIGS. 6A-C show exemplary embodiments of spreaders 450 that may be automatically and dynamically adjusted via system 400 and/or the process described in FIG. 5. FIG. 6A shows a paddle-type rotary spreader system 610. Rotary spreader system 610 includes two paddles or impellers 602 and 604 which rotate in opposite directions on substantially horizontal parallel axes. Residue falls or can be guided into the two paddles such as by passing between two parallel, substantially vertically-oriented plates. As residue falls, the residue is impacted and/or scooped in a downward motion by counter rotating paddles 602 at 604. Paddles 602 and 604 may rotate relatively quickly and may accelerate the residue as it falls causing residue to move along the path defined by guiding plates 612 and 614. As residue is moved by paddles 602 and 604 along guides 612 and 614, the residue is sprayed an outward fashion with a continuous range of velocities such that the residue can be sprayed in a fairly uniform, continuous manner off to the sides and downward from the spreader 610. The result of this motion is that the residue spray pattern may be substantially larger and wider than the spreader mechanisms in spreader 610. The spray pattern can be adjusted by actuators 616, which can change the orientation of the guiding plates 612 and 614. The spray pattern may be further altered by adjusting the rotational speeds of paddles 602 and 604. For example, if the actuators 616 move guide plates 612 and 614 further from the rotating paddles 602 and 604, more of the residue may fall closer to the spreader. The actuators 616 can, in some embodiments, adjust guiding plate 612 independently from guiding plate 614. In another example, if the rotational speed of paddle 602 is made substantially less than the rotational speed of paddle 604, paddle 604 may move more residue and shoot the residue further than rotating paddle 602, which is slower.

In some embodiments, various mechanisms may be used to direct the flow of falling residue before it reaches rotating paddles 602 and 604. In one embodiment, a plate 618 is adjustable such that it may direct more residue to one rotating paddle or the other. In other embodiments, horizontally adjustable plates or vanes may be used such that an opening to paddle 602 is adjustable relative to an opening to paddle 604, thereby supplying a variable amount of residue relative to paddles 602 and 604.

The adjustable mechanisms of spreaders 610 including the actuators 616, drive mechanisms that rotate paddles 602 and 604, and/or restrictor plates such as 618 are adjustable via electrical signals supplied by system 400 via signal path 418.

FIG. 6B depicts another spreader mechanism 620. In spreader mechanisms 620 rotating plates 622 and 624 are rotated on parallel, substantially-vertical axes. Residue will fall from a harvester onto these substantially planar rotating elements 622 and 624. Rotating plates 622 and 624 may include vanes or other elements that cause the falling residue to achieve substantially similar rotational velocities as rotating plates 622 and 624. As a result, residue impacting rotating plates 622 and 624 will be sprayed in a substantial uniform manner behind a harvester. The rotational velocities of rotating plates 622 and 624 may be adjusted such that the spray pattern can be varied to approximately the width of the header. By adjusting the rotational velocity of rotating element 622 relative to the rotational velocity of 624, system 400 may achieve an asymmetric spray pattern. For example, if rotating element 624 substantially faster than rotating element 622 the spray pattern on the right side will be substantially wider than the spray pattern on the left side.

In some embodiments, spreader system 620 includes an adjustable restricting mechanism (not shown) that can allow the relative restriction or allocation of residue to either rotating plates 622 or 624. For example, rotating plates 622 and 624 may be each served by an independent chute of falling residue. Adjusting either of these chutes can result in allocating more or less residue to be spread by rotating plates 622 and 624.

The relative rotating velocities of rotating plates 622 and 624 in FIG. 6B or rotating paddles 602 and 604 may be adjusted by any means known in the prior art. For example one rotating body may move faster or slower by means of a mechanical clutch system, a variable transmission, an electrical motor, or a variable frequency drive.

FIG. 6C shows yet another adjustable spreader mechanism 630 than can be used with the present invention. In this embodiment, the spreader mechanism may windrow the residue (e.g. roughly deposited in a narrow trail behind the combine so that it may be easily baled later) by sliding the residue out the back of the harvester along a horizontal or inclined plate 631, or spread via a spreading mechanism underneath plate 631. In some embodiments the underlying spreading mechanism can further cut the residue so that larger straw may be more easily spread. In some embodiments the spreader works by accelerating the residue laterally using a spinning element. Guiding fins on the left side 632 and or right side 634 may be adjusted, such as by angular adjustment, to determine the shape and location of the spray of the laterally accelerated material coming out of spreader 630. For example if a guiding fins 632 are adjusted to substantially restrict residue from exiting the harvester to the left side and the guiding fins 634 are adjusted direct residue to exit to the right side, the resulting residue spray will be asymmetric and generally to the right side of the harvester. The position or angle of guiding fins 632 and 634 may be electrically adjustable via actuators that are controlled via signal path 418 by system 400.

Any other adjustable spreader mechanisms that are adjustable pursuant to control signals via signal path 418 may be used in other embodiments.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed:

1. A system for controlling a residue distribution for use with a harvester, comprising:
    at least one positioning sensor;
    at least one controller for receiving positional information from the positioning sensor;
    at least one map accessible by the controller configured to record portions of a field that have been newly harvested by the harvester;
    an electrically adjustable spreader for distributing residue in accordance with control signals for the at least one controller, the controller configured to receive signals from the spreader which communicate spreader parameters; and
    wherein the controller is configured to calculate the residue spray pattern from the spreader parameters, the controller is configured to compare the residue spray pattern with the recorded portions of the field that have been newly harvested, and wherein when the residue spray pattern does not substantially match the newly harvested portions, the controller is configured to dynamically adjust the spreader to reduce or increase the residue spray pattern until the residue spray pattern substantially matches the newly harvested portions recorded in the map and to limit distributing residue from the newly harvested portions of the field to a previously harvested portion of the field that did not contribute to the residue being distributed.

2. The system of claim 1, wherein the at least one positioning sensor comprises a global positioning (GPS) sensor.

3. The system of claim 2, wherein the at least one positioning sensor further comprises an electronic compass sensor.

4. The system of claim 1, wherein the at least one positioning sensor comprises a cell phone having positioning capability.

5. The system of claim 1, further comprising a graphical interface for displaying information about the at least one map to an operator of the harvester.

6. The system of claim 5, wherein the graphical interface allows the operator of the harvester to input parameters that are used by the at least one controller in a determination of how to control the electrically adjustable spreader.

7. The system of claim 1, further comprising at least one electrical input from at least one sensor for determining status information about the harvester.

8. The system of claim 7, wherein the status information about the harvester comprises a determination whether the harvester is currently harvesting crop.

9. The system of claim 1, wherein the electrically adjustable spreader includes a first rotating device having a first rotational speed and a second rotating device having a second rotational speed that is substantially different from the first rotational speed to create an asymmetric spread pattern for the residue.

10. The system of claim 1, wherein the electrically adjustable spreader includes at least one actuated component to create an asymmetric spread pattern for the residue.

11. A method for controlling distribution of crop residue for use with a harvester, comprising the following steps:

receiving electronic positional information about the position of the harvester;

retrieving a map of an area being harvested from a memory;

automatically updating the map of the area to record a recently harvested area from the positional information;

determining a current position of at least a portion of the harvester from the positional information;

receiving signals from a residue spreader to communicate spreader parameters;

calculating the residue spray pattern from the spreader parameters;

comparing the residue spray pattern with the recently harvested area, and when the residue spray pattern does not substantially match the recently harvested area, dynamically adjusting the spreader to reduce or increase the residue spray pattern until the residue spray pattern substantially matches the recently harvested area recorded in the map, and limiting a distribution of residue from the recently harvested area of the field to a previously harvested area of the field.

12. The method of claim 11, wherein the step of receiving electronic positional information includes receiving location information from a GPS sensor.

13. The method of claim 12, wherein the step of receiving electronic positional information includes receiving location information from an electronic compass sensor.

14. The method of claim 11, wherein the step of receiving electronic positional information includes receiving location information from a cell phone having positioning capability.

15. The method of claim 11, further comprising displaying information about the map to an operator of the harvester.

16. The method of claim 11, further comprising receiving at least one electrical input from at least one sensor for determining status information about the harvester.

17. The method of claim 16, wherein the automatically updating the map includes a determination whether the harvester is currently harvesting crop based on the least one electrical input.

18. A method for controlling distribution of crop residue for use with a harvester, comprising the following steps:

receiving electronic positional information about the position of the harvester;

retrieving a map of an area being harvested from a memory;

automatically updating the map of the area to record a newly harvested area from the positional information;

determining a current position of at least a portion of the harvester from the positional information;

receiving signals from a residue spreader to communicate spreader parameters;

calculating the residue spray pattern from the spreader parameters;

comparing the residue spray pattern with the recorded newly harvested area, wherein when the residue spray pattern does not substantially match the newly harvested area, dynamically adjusting a spreader mechanism via electrical signals to adjust the residue spray pattern until the residue spray pattern substantially matches the newly harvested area recorded in the map, so as to limit distributing residue from the newly harvested area of the field to a previously harvested area of the field.

19. The method of claim 18, wherein the step of receiving electronic positional information includes receiving location information from a GPS sensor.

20. The method of claim 19, wherein the step of receiving electronic positional information includes receiving location information from an electronic compass sensor.

21. The method of claim 18, wherein the step of receiving electronic positional information includes receiving location information from a cell phone having positioning capability.

22. The method of claim 18, further comprising displaying information about the map to an operator of the harvester.

23. The method of claim 18, further comprising receiving at least one electrical input from at least one sensor for determining status information about the harvester.

24. The method of claim 23, wherein the automatically updating the map includes a determination whether the harvester is currently harvesting crop based on the least one electrical input.

* * * * *